(12) United States Patent
Sakaguchi et al.

(10) Patent No.: US 9,817,160 B2
(45) Date of Patent: Nov. 14, 2017

(54) WHITE REFLECTIVE FILM FOR EDGE-LIT BACKLIGHT AND BACKLIGHT USING THE SAME

(75) Inventors: Yoshihiko Sakaguchi, Tokyo (JP); Yuji Kawata, Otsu (JP); Osamu Watanabe, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 13/580,188

(22) PCT Filed: Feb. 18, 2011

(86) PCT No.: PCT/JP2011/053485
§ 371 (c)(1),
(2), (4) Date: Aug. 21, 2012

(87) PCT Pub. No.: WO2011/105294
PCT Pub. Date: Sep. 1, 2011

(65) Prior Publication Data
US 2012/0314450 A1  Dec. 13, 2012

(30) Foreign Application Priority Data

Feb. 24, 2010  (JP) ................................. 2010-038261
Oct. 6, 2010  (JP) ................................. 2010-226193

(51) Int. Cl.
*F21V 7/00*  (2006.01)
*F21V 7/04*  (2006.01)
(Continued)

(52) U.S. Cl.
CPC ......... *G02B 5/0226* (2013.01); *G02B 6/0055* (2013.01); *G02F 1/133615* (2013.01)

(58) Field of Classification Search
CPC .. G02B 6/0055; G02B 5/0226; G02B 6/0065; G02B 5/0242; G02B 5/0808;
(Continued)

(56) References Cited

U.S. PATENT DOCUMENTS 2,407,680 A * 9/1946 Palmquist et al. ............ 359/538
2,948,191 A * 8/1960 Hodgson, Jr. et al. ....... 359/538
(Continued)

FOREIGN PATENT DOCUMENTS

JP  8-262208 A  10/1996
JP  2000-214792 A  8/2000
(Continued)

OTHER PUBLICATIONS

"Nylon-11 Information and Properties", accessed from http://www.polymerprocessing.com/polymers/PA11.html on May 6, 2014.*

*Primary Examiner* — Erin Kryukova
(74) *Attorney, Agent, or Firm* — DLA Piper LLP (US)

(57) ABSTRACT

To obtain a white reflective film that is hard to warp and can ameliorate unevenness in the luminance even when used in such a manner as to be superimposed on a chassis having convex and concave portions for placing circuits and the like or used with an LED, and can prevent uneven close contact with a light guide plate and damage of the light guide plate, the white reflective film for edge-lit backlight is made to meets the requirements (i) to (iii):
(i) the stiffness is 2 to 10 mN·m;
(ii) convex portions are formed on at least one surface (A) and the maximum height of the convex portion is 15 to 60 μm; and
(iii) the cushion rate at the side of a surface (B) opposite to the surface (A) is 12% or more.

15 Claims, 3 Drawing Sheets

(51) Int. Cl.
*G02B 5/02* (2006.01)
*F21V 8/00* (2006.01)
*G02F 1/1335* (2006.01)

(58) Field of Classification Search
CPC .. G02B 5/0284; G02B 6/0031; G02B 6/0058; G02F 1/133605; G02F 1/133615; F21V 7/22
USPC ............... 362/602, 347, 623–629, 341, 343; 428/143, 147, 174, 180, 327; 359/534, 359/536–540, 542
See application file for complete search history.

(56) References Cited

U.S. PATENT DOCUMENTS

| | | | | |
|---|---|---|---|---|
| 6,579,606 | B1 * | 6/2003 | Uchiya et al. | 428/323 |
| 6,683,720 | B2 * | 1/2004 | Yoshida et al. | 359/599 |
| 6,906,761 | B2 * | 6/2005 | Nakano | 349/65 |
| 7,270,466 | B2 * | 9/2007 | Lee et al. | 362/625 |
| 7,905,650 | B2 * | 3/2011 | Ma et al. | 362/615 |
| 2003/0053008 | A1 | 3/2003 | Nakano | |
| 2004/0052079 | A1 * | 3/2004 | Nakano | 362/343 |
| 2007/0229956 | A1 | 10/2007 | Sakamoto et al. | |
| 2007/0229992 | A1 * | 10/2007 | Liao et al. | 359/838 |
| 2008/0247175 | A1 * | 10/2008 | Yoon et al. | 362/341 |
| 2010/0033650 | A1 | 2/2010 | Sato et al. | |
| 2010/0189959 | A1 * | 7/2010 | Sato et al. | 428/143 |

FOREIGN PATENT DOCUMENTS

| | | |
|---|---|---|
| JP | 2001-166295 A | 6/2001 |
| JP | 2002-090515 A | 3/2002 |
| JP | 2002-138150 A | 5/2002 |
| JP | 2003-092018 A | 3/2003 |
| JP | 2004-085633 A | 3/2004 |
| JP | 2007-293289 A | 11/2007 |
| JP | 2008-512719 A | 4/2008 |
| JP | 2009-244509 A | 10/2009 |
| JP | 2010-033053 A | 2/2010 |
| JP | 2010-038929 A | 2/2010 |
| WO | 2006/031043 A1 | 3/2006 |
| WO | 2009/075227 A1 | 6/2009 |

\* cited by examiner

WHITE REFLECTIVE FILM FOR EDGE-LIT BACKLIGHT AND BACKLIGHT USING THE SAME

TECHNICAL FIELD

The present invention relates to a white reflective film for ameliorating unevenness in the luminance in a liquid crystal backlight. The invention relates more particularly to a white reflective film that is suitably used for an edge-lit backlight for a liquid crystal display, a planar light source for lighting of a signboard/vending machine, and the like.

BACKGROUND ART

A liquid crystal display uses a backlight for lighting liquid crystal cells. According to the type of the liquid crystal display, edge-lit backlights have been employed for relatively small liquid crystal monitors, while direct backlights have been employed for relatively large liquid crystal televisions. As a reflective film for these backlights, a porous white film formed by air bubbles is commonly used (Patent Literature 1). There has been proposed a white film with an ultraviolet absorbing layer deposited for preventing yellowish discoloration of a film by an ultraviolet ray emitted from a cold cathode fluorescent lamp (Patent Literatures 2 and 3). Further, a reflective sheet in which a layer containing a soft bead is deposited on a base sheet layer has been developed as a product that is suitably used particularly with a prism-shaped light guide plate (Patent Literatures 4 and 5).

In recent years, however, edge-lit backlights have been employed even for liquid crystal televisions in association with thickness reduction of liquid crystal TVs, and development for edge-lit backlights has been vigorously conducted at the same time. Further, for reduction of power consumptions and freeing of mercury, light emission diodes (hereinafter abbreviated as LED) are being employed as light sources.

Figure 4:
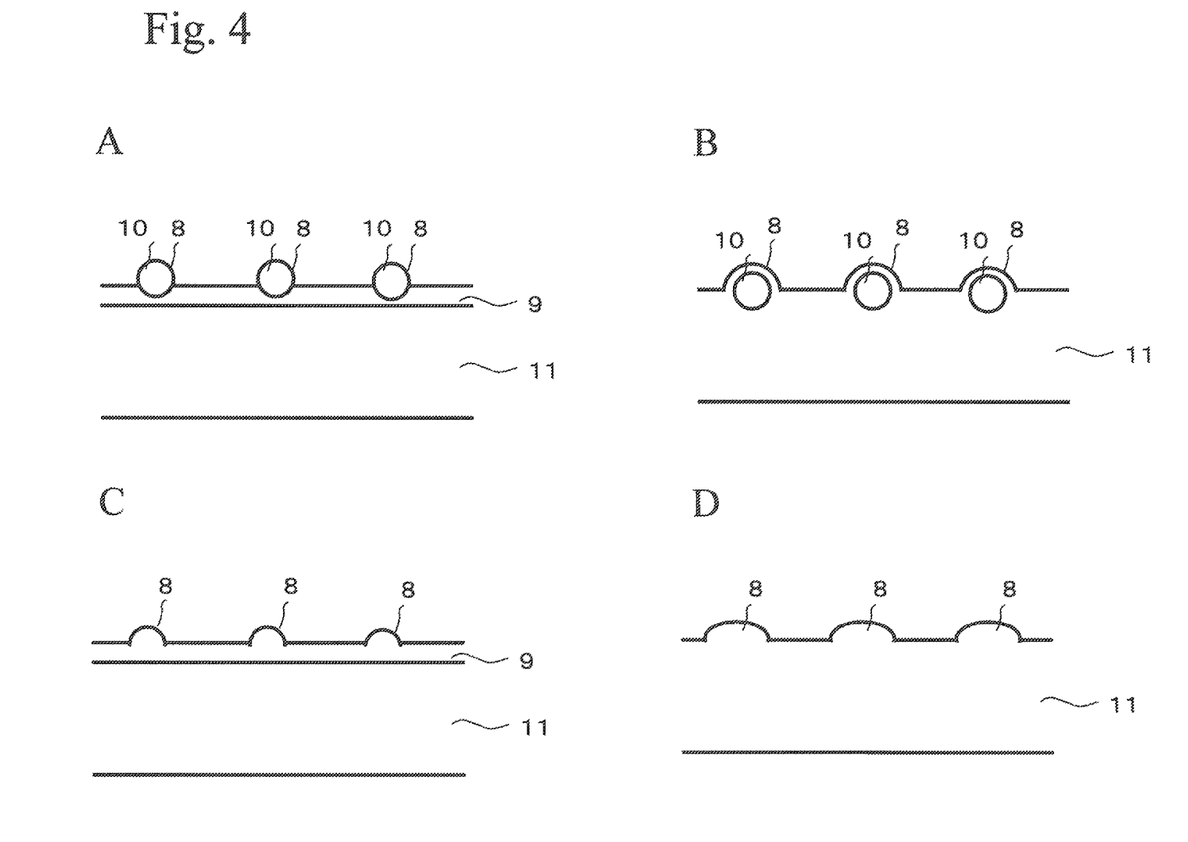
Figure 5:
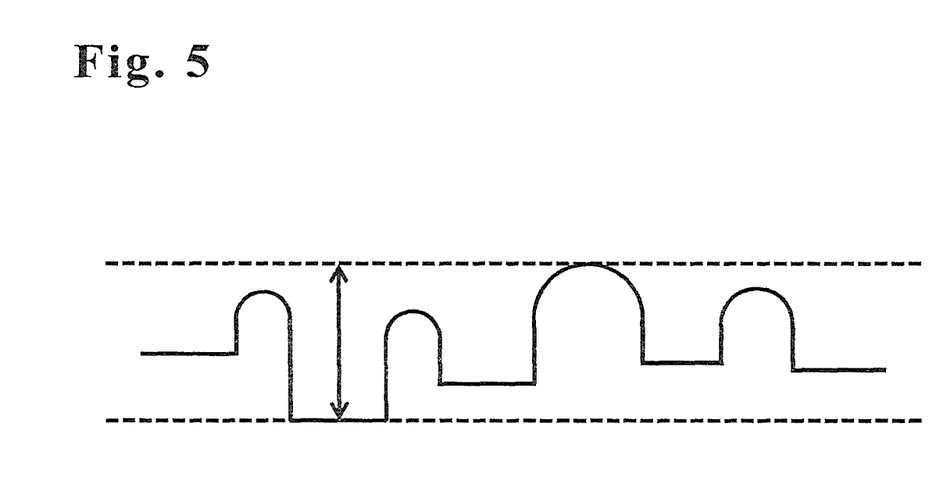
FIG. 5 schematically shows the maximum height of convex portions.

For a liquid crystal TV, unlike a notebook personal computer and a desk-top monitor, a high luminance is required and a large number of LEDs should be placed. Thus, it has been necessary to prepare a chassis using aluminum having a high heat conduction coefficient to take measures against heat radiation. However, employment of aluminum tends to result in poor mechanical strength. Thus, it has been necessary to form convexities and concaves on a back chassis 4 by drawing as shown in, for example, FIG. 4. The convexities and concaves have also been intended for saving space by placing circuits and the like in concaves 7 for thickness reduction.

For an edge-lit backlight, a light guide plate is absolutely necessary as an optical member. Concerning the light guide plate, a size of up to 25-inch type is sufficient for conventional notebook personal computers and desk top monitors, but a 30 to 60-inch type is required for TVs. Thus, light guide plates having convex portions with dot printing applied mainly on an acryl plate (thickness of 3 to 4 mm), light guide plates having concave portions by laser processing and UV transfer processes, and so on have been developed.

CITATION LIST

Patent Literature

Patent Literature 1: JP 8-262208 A
Patent Literature 2: JP 2001-166295 A
Patent Literature 3: JP 2002-90515 A
Patent Literature 4: JP 2003-92018 A
Patent Literature 5: JP 2008-512719 A

SUMMARY OF INVENTION

Technical Problem

In development of such a large and slim edge-lit backlight as described above, however, there are problems with a reflective sheet which mainly include problems (1) to (6) described below.

(1) A reflective sheet warps at convex and concave portions of a back chassis to cause unevenness in the luminance.

(2) A reflective sheet warps by rise of temperature around an LED light source to cause unevenness in the luminance.

(3) A light guide plate and a reflective sheet unevenly closely contact each other to cause unevenness in the luminance.

(4) A reflective sheet is raised by local convex portions resulting from defective molding of a back chassis, and strongly abuts against a light guide plate and resultantly, the light guide plate is scratched to cause unevenness in the luminance.

(5) In the vibration test of a TV, a light guide plate and a reflective sheet rub against each other and consequently, the light guide plate is scratched to cause unevenness in the luminance.

(6) White spots (areas visually perceived as bright dots) are generated in a backlight using a concave light guide plate.

Concerning the problem that a light guide plate is scratched to cause unevenness in the luminance, the reflective sheets described in Patent Literatures 4 and 5 exhibit an effect to a certain degree. However, even those reflective sheets cannot adequately satisfy a stiffness/convex maximum height/cushion property required for uses of liquid crystal TVs that are reduced in thickness and increased in size.

In view of such problems with conventional techniques, the present invention provides a white reflective film that is hard to warp and can ameliorate unevenness in the luminance even when used in such a manner as to be superimposed on a chassis having convex and concave portions for placing circuits and the like or used with an LED, and can prevent uneven close contact with a light guide plate and damage of the light guide plate.

Solution to Problem

For solving such problems, the present invention employs any of the following aspects (1) to (7).
(1) A white reflective film for edge-lit backlight which meets the requirements (i) to (iii):
(i) the stiffness is 2 to 10 mN·m;
(ii) convex portions are formed on at least one surface (A) and the maximum height of the convex portion is 15 to 60 µm; and
(iii) the cushion rate at the side of a surface (B) opposite to the surface (A) is 12% or more.
(2) The white reflective film for edge-lit backlight as set forth in the aspect (1), wherein a base white film has on at least one surface a coating layer containing spherical particles, and the compressive strength of the spherical particles is 0.1 to 2.0 kgf/mm$^2$.

(3) The white reflective film for edge-lit backlight as set forth in the aspect (2), wherein the spherical particles are nylon.
(4) The white reflective film for edge-lit backlight as set forth in the aspect (3), wherein the nylon is nylon 12 and/or a copolymer of nylon 6 and nylon 12.
(5) The white reflective film for edge-lit backlight as set forth in any of the aspects (2) to (4), wherein the specific gravity of the spherical particles is 0.8 to 1.10.
(6) A backlight for a liquid crystal display which comprises the white reflective film for edge-lit backlight as set forth in any of the aspects (1) to (5), and has a backlight size of 76.2 cm (30 inches) or greater.
(7) The backlight for a liquid crystal display as set forth in the aspect (6), wherein the backlight has a light guide plate with the size of a surface convex and concave being 10 μm or greater, and the white reflective film for edge-lit backlight is placed such that the convex portion of the surface (A) faces the light guide plate.

Advantageous Effects of Invention

According to the present invention, a white reflective film suitable for ameliorating unevenness in the luminance particularly in an edge-lit backlight can be provided by setting the stiffness of the white reflective film within a specific range, forming convex portions having a specific size on at least one surface (A) (reflective surface at the time of use, surface facing a light guide plate) and further, setting to a specific value or greater the cushion rate at the side of a surface (B) opposite to the surface (A). The white reflective film obtained by the present invention is preferred as it can reduce unevenness in the luminance more significantly than before when used for an edge-lit backlight provided with an LED light source and used for a planar light source for lighting (particularly when used for a backlight having a size of 76.2 cm (30 inches) or greater).

BRIEF DESCRIPTION OF THE DRAWINGS

FIGS. 4A-4D schematically show portions of cross sections of white reflective films. The layer configurations are as follows:
FIG. 4A: coating layer, present; particles, present.
FIG. 4B: coating layer, none; particles, present.
FIG. 4C: coating layer, present; particles, none.
FIG. 4D: coating layer, none; particles, none.

DESCRIPTION OF EMBODIMENTS

As a result of conducting vigorous studies on the aforementioned problem, that is a white reflective film having reduced unevenness in the luminance and reduced white spots in an edge-lit backlight, the present invention has found that the aforementioned problem is solved all at once when the stiffness of the white reflective film, the maximum height of convex portions formed on at least one surface (A) and the cushion rate at the side of a surface opposite to the surface (A) are each within a specific range.

The unevenness in the luminance means spots described below, which is visually observed when a backlight is lit.
(i) Stripe-shaped spot
(ii) Puddle-shaped spot
(iii) Spot seen as a dark area
The white spot means a dot spot in the form of an ellipsoid with a diameter of less than 5 cm, which is visually observed when a backlight is lit.

The white reflective film according to the present invention will be described in detail below.

[Basic Configuration of White Reflective Film]

Stiffness of White Reflective Film

The white reflective film according to the present invention has a stiffness of 2 to 10 mN·m, and preferably 3 to 10 mN·m. If the stiffness is less than 2 mN·m, unevenness in the luminance in an edge-lit backlight increases. Conversely, if the stiffness is greater than 10 mN·m, unevenness in the luminance in an edge-lit backlight increases, and curls accompanying a white reflective film when winding the film from a roll body may become so large that workability is compromised when the backlight is assembled.

A method for measuring the stiffness of a white reflective film is as follows.
(i) Measurements are made in a test environment of 23° C. and 50% RH in accordance with JIS P8125 (2000) using "STIFFNESS TESTER" V5 manufactured by TARBER INSTRUMENT corp.
(ii) Measurements are made three times in each of both the directions of the reflective surface side and the non-reflective surface side of the white reflective film, and an average of the measurements is designated as "stiffness".

Convex Portion on the Reflective Surface Side

The white reflective film according to the present invention has convex portions on at least one surface (surface at the reflective surface side, hereinafter referred to as surface (A)). The convex portion should have a maximum height of 15 to 60 μm, preferably 15 to 40 μm, and most preferably 15 to 25 μm. If the maximum height is less than 15 μm, unevenness in the luminance in an edge-lit backlight increases. On the other hand, if the maximum height is greater than 60 μm, a light guide plate tends to be scraped.

A method for measuring the maximum height of convex portions formed on at least one surface of the white film is as follows.
(i) First, concerning the surface of the white reflective film, random areas (each area has a size in a range of 2 mm×2 mm) are observed using Scanning Electron Microscope ABT-32 manufactured by TOPCON CORPORATION. The largest convex portion among the 5 areas observed is selected.
(ii) The selected convex portion is then cut along a direction perpendicular to the film plane at a knife tilt angle of 3° using Rotary Microtome manufactured by Nippon Microtome Laboratory Co., Ltd. A film cross section obtained is observed using Scanning Electron Microscope ABT-32 manufactured by TOPCON CORPORATION.
(iii) Five concave portions having the smallest thickness are selected in an area of 2 mm×2 mm of a film cross section photograph obtained, differences between the concave portions and the selected convex portion are calculated, and a number average of the values is designated as "maximum height of convex portions formed on at least one surface of the white film".

Cushion Ratio at the Non-Reflective Surface Side

The white reflective film according to the present invention has a cushion rate of 12% or greater at the side of a surface opposite to the surface (A) (hereinafter referred to as surface (B)), i.e. a surface which is the non-reflective surface when the film is incorporated into a backlight. The upper limit is not particularly limited, but if the cushion rate is greater than 50%, the stiffness of the white reflective film decreases and the unevenness in the luminance tends to occur. If the cushion rate is less than 12%, a reflective sheet strongly abuts against a light guide plate by local chassis convex portions generated due to defective molding of the back chassis, and resultantly the light guide plate is scratched as stresses by protrusions of convex portions cannot be absorbed, leading to occurrence of unevenness in the luminance.

The cushion rate of the white reflective film is a value measure by the following method.

(i) A seat of 10 g is mounted on the upper part of a spindle of a dial gage manufactured by Mitutoyo Corporation and brought down onto a sample set on a measurement table by lifting the spindle in a test environment of 23° C. and 50% RH. At this time, the non-reflective surface is situated at the spindle side.

(ii) A weight of 50 g is placed on the seat, the thickness is read after 5 seconds, and this value is taken as a μm.

(iii) The weight on the seat is replaced by a weight of 500 g, the thickness is read after 5 seconds, this value is taken as b μm, and a value determined by the following formula is designated as "cushion rate c".

Cushion rate $c$ (%)=100×($a-b$)/$a$.

[Basic Method for Producing White Reflective Film]

The white reflective film according to the present invention as described above can be produced by, for example, any of the following methods.

(I) A specific resin layer and a coating layer are provided on both surfaces of a base white film to form a white reflective film having the feature described above.

(II) When producing a white film by melt extrusion, a specific raw material is used to form a white reflective film having the feature described above.

(III) A white reflective film having the feature described above is obtained by a combination of the methods (I) and (II).

Methods for keeping various kinds of properties within a desired range in the basic method described above include the following methods, respectively.

Method for Controlling Stiffness

Methods for controlling the stiffness of the white reflective film to fall within the range described above include, but are not limited to, the following methods.

(i) The thickness of the white reflective film is set within a range of, for example, 200 to 450 μm to control the stiffness.

(ii) The white reflective film is formed as a film of two-layered or three-layered structure including a layer that contains no air bubbles as described later, and the thickness of the layer that contains no air bubbles is adjusted to control the stiffness.

Method for Forming Convex Portions on the Reflective Surface Side

Methods for forming convex portions with the maximum height falling within the above-mentioned range on the surface (A) side include the following methods.

(i) When the white reflective film is produced by the production method (I) or (III) described above, an appropriate binder resin and spherical particles are mixed in an appropriate solvent (such as an organic solvent), and the mixture is coated on a base white film, and then dried to thereby form convex portions.

(ii) When the white reflective film is produced by the production method (II) or (III) described above, particles to form convex portions are preliminarily incorporated into a resin extruded in a step of producing a white film by melt extrusion, and convex portions are formed in a drawing step.

(iii) When the white reflective film is produced by the production method (I) or (III) described above, an UV-curable resin is coated on a base film, and then subjected to UV irradiation in a step concurrent with or subsequent to template molding to form convex portions.

(iv) When the white reflective film is produced by the production method (II) or (III) described above, two or more component polymers, organic substances or inorganic substances are mixed, the mixture is melt-extruded, and at least one component is then dissolved by solvent extraction to form convex portions on the outer layer of the white film.

Among them, the method by coating in (i) is preferable in the sense that high performance can be achieved economically.

Method for Controlling a Cushion Rate at the Non-Reflective Surface Side

Methods for controlling the cushion rate to fall within the above-mentioned range include, for example, the following methods.

(i) When the white reflective film is produced by the production method (II) or (III) described above, an incompatible polymer such as polymethylpentene or a cyclic polyolefin or inorganic particles of barium sulfate or the like are added to a thermoplastic resin constituting the white reflective film to control the cushion rate.

(ii) When the white reflective film is produced by the production method (I) or (III) described above, a resin layer or a coating layer which absorbs stresses is deposited on the non-reflective surface side of a base white reflective film, or inorganic particles of barium sulfate or the like are added to the base white reflective film itself to control the cushion rate.

[Preferred Aspects of White Reflective Film]

When the white reflective film of the present invention is produced by the production method (I) or (III) described above, it is also preferable to employ, for example, the following configurations.

Compressive Strength of Spherical Particles

The compressive strength of spherical particles in a coating layer deposited on at least one surface of a base white film is not particularly limited as long as unevenness in the luminance does not occur in an edge-lit backlight, but is preferably 0.1 to 2.0 kgf/mm$^2$ (0.98 to 19.6 Mpa), further preferably 0.1 to 1.5 kgf/mm$^2$ (0.98 to 14.7 Mpa), and most preferably 0.1 to 1.2 kgf/mm$^2$ (0.98 to 11.8 Mpa). If the compressive strength is less than 0.1 kgf/mm$^2$ (0.98 Mpa), resin particles may be collapsed by kneading shear when spherical particles are stirred to prepare a coating, which is not preferable. Conversely, if the compressive strength is greater than 2 kgf/mm$^2$ (19.6 Mpa), the light guide plate may be scraped.

The method for measuring the compressive strength of spherical particles is as follows.

(i) A binder resin is extracted from the coating layer of the white reflective film using an organic solvent, the organic solvent is distilled away, and spherical particles in the coating layer are then collected.

(ii) Micro Compression Testing Machine MCTM 2000 manufactured by Shimadzu Corporation is used to measure a deformation volume and a load of a resin particle when a load of 1 gf is applied at a constant loading rate to one of spherical particles obtained, and a load when the particle diameter is deformed by 10% and a particle radius before compression are included in the formula:

$$\text{compressive strength (kgf/mm}^2\text{)}=2.8\times\text{load (kgf)}/\{\pi\times(\text{particle radius (mm)})^2\}.$$

(iii) Steps (i) and (ii) are carried out for randomly collected 5 samples, and an average thereof is designated as "compressive strength of spherical particles".

As an organic solvent that is used for extracting a binder resin, use may be made of those exemplified as solvents for mixing a binder resin and spherical particles that constitute a coating layer as described later.

Composition of Spherical Particles

The type of spherical particles is not particularly limited, and any of organic and inorganic particles may be used. As organic spherical particles, acrylic resin particles, silicone resin particles, nylon resin particles, styrenic resin particles, polyethylene resin particles, benzoguanamine resin particles, urethane resin particles or the like may be used. As inorganic spherical particles, silica, aluminum hydroxide, aluminum oxide, zinc oxide, barium sulfate, magnesium silicate or mixtures thereof may be used.

Above all, when a binder resin comprising a copolymer of an acryl monomer and an ultraviolet absorber as described later is used as a binder resin for the coating layer, acrylic resin particles, silicone resin particles, nylon resin particles and urethane resin particles are preferably used in terms of a difference in refractive index between the binder resin and spherical particles, particle dispersibility, coatability and the like. Further, in terms of inclination to scratch the light guide plate, nylon resin particles are more preferable, and most preferable are nylon 12 resin particles and/or resin particles comprising a copolymer of nylon 6 and nylon 12. As nylon 12 resin particles, nylon fine particles SP 500 and SP 10 (manufactured by Toray Industries, Inc.), "GANZ PEARL" (registered trademark) GPA 550 (manufactured by GANZ CHEMICAL CO., LTD.) and so on may be used. As resin particles comprising a copolymer of nylon 6 and nylon 12, SP 20 (manufactured by Toray Industries, Inc.) may be used.

Specific Gravity of Spherical Particles

The specific gravity of spherical particles is not particularly limited as long as unevenness in the luminance does not occur in an edge-lit backlight. However, the specific gravity is preferably 0.8 to 1.10, and further preferably 0.8 to 1.05 in terms of dispersibility with a binder resin and an organic solvent as described later. If the specific gravity of spherical particles is greater than 1.10, dispersibility of spherical particles may decrease to the extent that coating streaks and coating point-like defects frequently occur to reduce a yield, which is not preferable. The lower limit is not particularly limited, but if the specific gravity of spherical particles is less than 8, that is less than the specific gravity of preferable organic solvents described later (specific gravity of organic solvent: ethyl acetate: 0.9, toluene: 0.9, methyl ethyl ketone: 0.8), dispersibility may be degraded.

The method for measuring the specific gravity of spherical particles according to the present invention is as follows.
(i) A binder resin is extracted from the coating layer of the white reflective film using an organic solvent, the organic solvent is distilled away, and spherical particles in the coating layer are then collected.
(ii) A real density measuring device (for example AUTO TRUE DENSER MAT-7000 manufactured by SEISHIN ENTERPRISE Co., Ltd.) is used to make measurements for randomly collected 5 samples, and a number average thereof is designated as "specific gravity of spherical particles".

Composition of Binder Resin

The binder resin which constitutes a coating layer provided on at least one surface of the base white film is not particularly limited, but a resin having an organic component as a main ingredient is preferable, and mention is made of, for example, a polyester resin, a polyurethane resin, an acryl resin, a methacryl resin, a polyamide resin, a polyethylene resin, a polypropylene resin, a polyvinyl chloride resin, a polyvinylidene chloride resin, a polystyrene resin, a polyvinyl acetate resin, a fluorine resin and a silicone resin. These resins may be used alone or two or more thereof may be used. Above all, a polyester resin, a polyurethane resin and an acryl or methacryl resin are preferably used in terms of heat resistance, particle dispersibility, coatability and glossiness.

An ultraviolet absorber and a light stabilizer are preferably contained in the binder resin layer in terms of light resistance of the coating layer. The ultraviolet absorber and light stabilizer are classified broadly into inorganic and organic types. The form of incorporating such agents is not particularly limited, and may be a method of mixing them with a resin that forms the coating layer, or the like, or may be, for example, a method of copolymerizing them with a resin that forms the coating layer when it is desired to prevent the agents from bleeding out of the coating layer.

As the inorganic ultraviolet absorbers, titanium oxide, zinc oxide, cerium oxide and the like are generally known and above all, at least one selected from the group consisting of zinc oxide, titanium oxide and cerium oxide is preferably used because they do not breed out and are excellent in economical efficiency, light resistance, ultraviolet absorbency and photocatalytic activity. The ultraviolet absorber may be used in combination of several kinds as required. Above all, zinc oxide or titanium oxide is most preferable in terms of economical efficiency, ultraviolet absorbency and photocatalytic activity.

The organic ultraviolet absorbers include benzotriazole, benzophenone, and the like. Particularly benzotriazole is suitably used because it contains nitrogen in a structure and therefore acts as a fire retardant as well, but the organic ultraviolet absorber is not limited thereto. These ultraviolet absorbers only absorb ultraviolet light, and cannot trap organic radicals generated by ultraviolet irradiation, and therefore the base thermoplastic resin film may be successively deteriorated by the radicals. A light stabilizer is suitably combined for trapping the radicals, and a hindered amine (HALS) compound is preferably used as such a light stabilizer.

Here, a copolymerization monomer for immobilizing the organic ultraviolet absorber and/or light stabilizer is an acrylic or styrenic vinyl monomer because of high versatility and from the economical viewpoint. Among such copolymerization monomers, the styrenic vinyl monomer has an aromatic ring and is therefore apt to yellowish discoloration, and therefore a copolymer with the acrylic vinyl monomer is most preferably used in terms of light resistance.

For the benzotriazole, 2-(2'-hydroxy-5'-methacryloxyethylphenyl)-2H-benzotriazole (trade name: RUVA-93; manufactured by Otsuka Chemical Co., Ltd.) may be used as a compound with a reactive vinyl monomer substituted on the benzotriazole and also for the hindered amine compound, 4-methacryloyloxy-2,2,6,6-tetramethylpiperidine ("Adekastab LA-82"; manufactured by ADEKA CORPORATION) as a compound with a reactive vinyl monomer substituted thereon.

In the present invention, as the organic ultraviolet absorber, a resin containing an organic ultraviolet absorber such as benzotriazole or benzophenone, or a resin prepared by copolymerizing a benzotriazole or benzophenone reactive monomer, or a resin prepared by including and/or copolymerizing a light stabilizer such as a hindered amine (HALS) reactive monomer with the above-mentioned resins may be used within the bounds of not hindering the effect of the present invention.

Organic ultraviolet absorbing resins including the resin prepared by copolymerizing a benzotriazole or benzophenone reactive monomer, the resin prepared by copolymerizing a hindered amine (HALS) reactive monomer with the above-mentioned resin, and the like are more preferable because of the increased effect of absorbing ultraviolet light as a thin layer, and among them, benzotriazole is especially preferable because it contains nitrogen in a structure and therefore acts as a fire retardant as well.

Methods for producing these resins, and so on are disclosed in detail in paragraphs [0019] to [0039] of Japanese Patent Application Laid-Open No. 2002-90515. Particularly, "HALSHYBRID" (registered trademark) (manufactured by Nippon Shokubai Co., Ltd.) and the like containing as an effective component a copolymer of an acryl monomer and an ultraviolet absorber may be used.

Base White Film

When the base white film is used as a reflective film for a backlight for a liquid crystal display and for the purpose of lighting, the higher the visible light reflectivity, the better. Therefore, films containing therein air bubbles and/or incompatible particles, specifically white thermoplastic resin films are preferably used. These white thermoplastic resin films are not limited, but polyolefin and polyester films such as porous unstretched or biaxially stretched polypropylene films and porous unstretched or stretched polyethylene terephthalate films are preferably used. Particularly in terms of molding characteristics and productivity, polyester films are preferably used.

Methods for producing these white thermoplastic resin films, and so on are disclosed in detail in paragraphs [0034] to [0057] of Japanese Patent Application Laid-Open No. 8-262208, paragraphs [0007] to [0018] of Japanese Patent Application Laid-Open No. 2002-90515, paragraphs [0008] to [0034] of Japanese Patent Application Laid-Open No. 2002-138150 and the like.

Particularly the porous white biaxially stretched polyethylene terephthalate film disclosed in Japanese Patent Application Laid-Open No. 2002-90515 may be preferably used as the base white film in the present invention for the reason described previously. Further, in terms of the heat resistance and reflectivity, a porous white biaxially stretched polyethylene terephthalate film mixed and/or copolymerized with polyethylene naphthalate is preferable, and particularly a porous white biaxially stretched polyethylene terephthalate film containing inorganic particles for improving fire retardancy of the white thermoplastic resin film itself is preferable. The content of inorganic particles contained in the white thermoplastic resin film is preferably 2% by mass or more, more preferably 7% by mass or more, further preferably 10% by mass or more, and most preferably 30% by mass or more based on the total mass of the white thermoplastic resin film.

The structure of the base white film according to the present invention may be selected as appropriate according to the use purpose and required properties, and is not particularly limited. Specifically, composite films of a single layer and/or two or more layers having a structure of at least one layer may be exemplified, and air bubbles and/or inorganic particles are preferably contained in at least one layer thereof.

The film of single-layer (i.e. one-layer) structure is a film consisting of only a single layer (hereinafter referred to as A layer), and inorganic particles and/or air bubbles are contained in the A layer.

The film of two-layer structure is a film having a structure of A layer/B layer in which a B layer is deposited on the A layer, and inorganic particles and/or air bubbles are contained in at least one of the A layer and the B layer. The content of inorganic particles is preferably 2% by mass or more, more preferably 7% by mass or more, further preferably 10% by mass or more, and most preferably 30% by mass or more based on the total mass of the base white film, namely the total mass of two layers.

Further, the film of three-layer structure is a film having a structure of A layer/B layer/A layer or A layer/B layer/C layer in the same manner as described previously, and inorganic particles and/or air bubbles are contained in at least one of these layers. As in the case of the film of two-layer structure, the content of inorganic particles is preferably 2% by mass or more, more preferably 7% by mass or more, further preferably 10% by mass or more, and most preferably 30% by mass or more based on the total mass of the base white film. In the case of the three-layer structure, the B layer is most preferably a layer that contains air bubbles in terms of productivity.

The number average particle diameter of inorganic particles contained in the base white film is preferably 0.3 to 2.0 μm.

As the inorganic particles, calcium carbonate, magnesium carbonate, zinc carbonate, titanium oxide, cerium oxide, magnesium oxide, barium sulfate, zinc sulfate, calcium phosphate, silica, alumina, mica, mica titanium, talc, clay, kaolin, lithium fluoride, potassium fluoride and the like may be used.

A method for producing the white thermoplastic resin film of three-layer structure, among the base white films, will now be described. However, the present invention is not limited to this example.

First, polymethylpentene as an incompatible polymer and a copolymer of polyethylene glycol, polybutylene terephthalate and polytetramethylene glycol as a specific gravity reducing agent are incorporated into polyethylene terephthalate. The mixture is sufficiently mixed and dried and fed to an extruder B heated at 270 to 300° C. Polyethylene terephthalate containing additives of inorganic substances of $BaSO_4$, $CaCO_3$ and $TiO_2$ and/or organic substances is fed to an extruder A by a normal method. In a three-layer head of a T die, the polymers are laminated into a three-layer structure of A layer/B layer/A layer such that the polymer of the extruder B is situated at the inner layer (B layer) and the polymer of the extruder A is situated at both outer layers (A layers).

This molten laminate sheet is brought into close contact with a drum cooled to a temperature of 10 to 60° C. at the drum surface by an electrostatic force and cooled and solidified on the drum to obtain an unstretched film. The unstretched film is guided to a group of rolls heated at 80 to 120° C., longitudinally stretched in a longitudinal direction at a ratio of 2.0 to 5.0, and cooled by a group of rolls at 20 to 50° C. Subsequently, the longitudinally stretched film is guided to a tenter while being gripped by a clip at both ends, and horizontally stretched in a direction perpendicular to the longitudinal direction in an atmosphere heated at 90 to 140° C. In this case, the stretch ratio is 2.5 to 4.5 in each of longitudinal and horizontal directions, but the surface ratio (longitudinal stretch ratio×horizontal stretch ratio) is preferably 9 to 16. That is, if the surface ratio is less than 9, the film obtained tends to have poor whiteness, and if the area ratio is greater than 16, the film tends to be broken when stretched, resulting in poor film formability. For imparting flatness and dimensional stability to the film thus biaxially stretched, the film is thermally fixed at 150 to 230° C. in the tenter, slowly cooled homogenously, further cooled to room temperature, and then wound by a winder to obtain a base thermoplastic resin film. The thickness of the base white film is set to a thickness in a range of, for example, 200 to 450 µm.

Base white films of single-layer structure include "Lumirror" (registered trademark) E20 (manufactured by Toray Industries, Inc.) and SY 64 and SY 74 (manufactured by SKC Co., Ltd.)., base white films of two-layer structure include "Tetoron" (registered trademark)Films UXZ1, UXSP and UXG (manufactured by Teijin DuPont Films Japan Limited), and base white films of three-layer structure include "Lumirror" (registered trademark) E6SL, E6SR and E6SQ and "Tetoron" (registered trademark) Films UX and UXH (manufactured by Teijin DuPont Films Japan Limited).

Method for Producing a Coating Layer

For forming convex portions on at least one surface of the base white film, any method may be employed. For example, mention is made of a method in which a coating liquid prepared by incorporating a binder resin and spherical particles in a solvent is coated during production of the base white film (in-line coating) or coated on the base white film after completion of crystalline orientation (off-line coating) using various kinds of coating processes such as gravure coating, roll coating, spin coating, reverse coating, reverse kiss-coating, bar coating, screen coating, blade coating, air knife coating, slit die coating, lip coating and dipping. The coating effective width is not limited, and reverse kiss-coating may be most preferably used when the product width is flexibly adapted.

Solvent for Incorporating a Binder Resin and Spherical Particles

A solvent for incorporating a binder resin and spherical particles that constitute the coating layer is an organic compound having a nature of dissolving a binder resin, and is dried after being coated on the surface of the base white film. Specifically, mention is made of aromatic hydrocarbons such as toluene, xylene and styrene, ketones such as acetone, methyl ethyl ketone, methyl isobutyl ketone and cyclohexanone, alcohols such as methanol, isopropyl alcohol and isobutyl alcohol, chlorinated aromatic hydrocarbons such as chlorbenzene and ortho-dichlorobenzene, chlorinated aliphatic hydrocarbons including methane derivatives such as monochlormethane and ethane derivatives such as monochlorethane, esters such as methyl acetate, ethyl acetate and butyl acetate, ethers such as ethyl ether and 1,4-dioxane, glycol ethers such as ethylene glycol monomethyl ether, alicyclic hydrocarbons such as cyclohexane, aliphatic hydrocarbons such as normal hexane, and the like. Above all, aromatic hydrocarbon, ketone and ester organic solvents are preferable.

The solvent is not particularly limited as long as it dissolves a binder resin and the like, but the use of toluene and xylene is preferably avoided because of the VOC (volatile organic compound) regulation in recent years, and methyl ethyl ketone, methyl isobutyl ketone, cyclohexanone, methyl acetate, ethyl acetate and butyl acetate are preferable in terms of solubility, versatility and costs. Two or more solvents having different boiling points are preferably mixed and used in the sense that the drying rate can be adjusted.

Other Additives that can be Used in the Base White Film and the Coating Layer

Various kinds of additives may be added to the base material white film and the coating layer within the bounds of not inhibiting the effect of the present invention. As the additives, for example, organic and/or inorganic fine particles, a fluorescent brightener, a crosslinker, a heat resistance stabilizer, an oxidation resistance stabilizer, an organic lubricant, an antistatic agent, a nucleating agent, a dye, a filler, a dispersant, a fire retardant, a coupling agent and the like may be added and blended and used.

[Applications of White Reflective Film]

The white reflective film of the present invention is used in an edge-lit backlight, and may be suitably used particularly for an edge-lit backlight for a liquid crystal display, and a planar light source for lighting of a signboard, a vending machine and the like.

In addition, the white reflective film may also be suitably used as a reflective plate that constitutes various kinds of planar light sources, and a sealing film and a back sheet for solar battery modules required to have reflection properties. In addition, the white reflective film may be also used as a substitute for paper, namely a card, a label, a seal, a delivery slip, a receiver paper for a video printer, a receiver paper for an inkjet or bar code printer, a poster, a map, a dust-free paper, a display board, a white board, a base material of a receiving sheet used for various kinds of printing records such as heat sensitive transfer, offset printing, telephone cards and IC cards, a building material such as a wall paper, a member mounted on a light fitting and an indirect light fitting used indoors and outdoors, an automobile/railroad/aircraft and the like, and an electronic component for a circuit material and the like.

[Edge-Lit Backlight]

Structure of Edge Light Backlight

The white reflective film of the present invention is suitably used for an edge-lit backlight. The edge-lit backlight has the white reflective film of the present invention and a light guide plate incorporated in this order in, for example, a chassis having convexities and concaves, wherein the white film is incorporated with the surface (A) facing the light guide plate. A light source such as an LED is placed at the edge part of the light guide plate. Further, a diffuser panel, a prism and so on may be placed on the front surface of the light guide plate (opposite to the white reflective film).

A high-quality backlight being free from unevenness in the luminance and having the light guide plate scratched to a lesser degree can be prepared by using the white reflective film of the present invention for this edge-lit backlight. Particularly, an edge-lit backlight for TV which uses an LED light source that has been well developed in recent years has a large backlight area, but when the white reflective film of the present invention is used, curls during assembly and waviness by generation of heat by the LED light source are reduced, and thus a high-quality backlight can be prepared with a good yield.

The size (diagonal line length of rectangle) of a backlight for a liquid crystal display having a light emitting diode as a light source, which exhibits the effect of the present invention more effectively, is 76.2 cm (30 inches) or more, preferably 88.9 cm (35 inches) or more, further preferably 101.6 cm (40 inches) or more, and most preferably 127 cm (50 inches) or more.

Light Guide Plate

For more effectively exhibiting the effect of the white reflective film according to the present invention, concave portions or convex portions of 3 μm or greater are preferably provided on the surface of the light guide plate in the edge-lit backlight. Further, concave portions or convex portions of 10 μm or greater are preferably provided.

Here, convexities and concaves on the surface of the light guide plate are defined as follows.
(i) A light guide plate placed on the upper part of the white reflective film is taken out from a liquid crystal television.
(ii) The light guide plate is cut into pieces of 5 cm square, and 5 pieces are randomly picked up.
(iii) Observations are made with the magnification of an objective lens set to 20× using Laser Microscope VK-9700 manufactured by KEYENCE CORPORATION, and areas detected to have a height or depth of 1 μm or more are considered as surface convexities and concaves.

Figure 1:
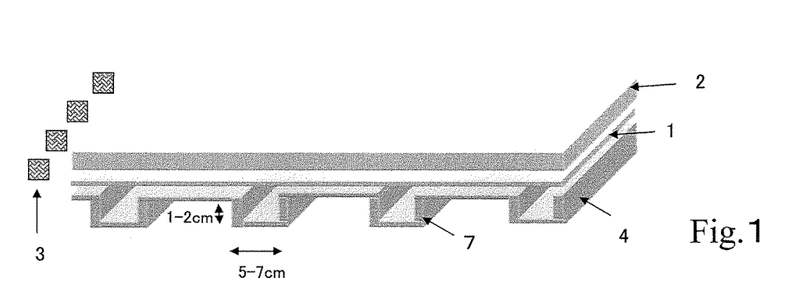
FIG. 1 is a schematic diagram showing one embodiment of a large edge-lit backlight having an LED as a light source.
Figure 2:
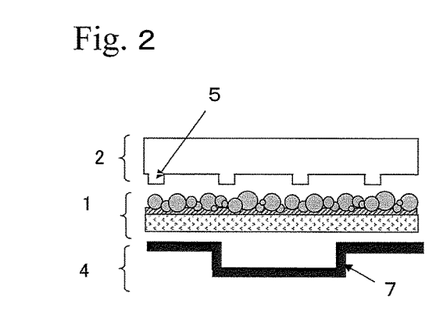
FIG. 2 is a relationship schematic diagram of a light guide plate having convex portions, a white reflective film and a back chassis.
Figure 3:
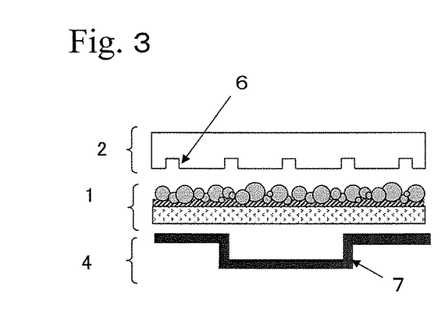
FIG. 3 is a relationship schematic diagram of a light guide plate having concave portions, a white reflective film and a back chassis.

Above all, a light guide plate prepared by applying dot printing on an acryl plate (thickness of 3 to 4 mm) and having convex portions shown in FIG. 2 and a light guide plate having concave portions by UV transfer method as shown in FIG. 3 are preferable in terms of the production capacity. A light guide plate having concave portions by laser processing is preferable in the sense that the backlight brightness is high and the possibility of scraping the light guide plate by the white reflective film is low.

Further, the maximum height of convex portions formed on at least one surface of the white reflective film is preferably larger than convexities and concaves on the surface of the light guide plate. By so doing, unevenness in the luminance in the backlight can be further reduced. It is presumed that this is correlated with unevenness in the luminance by close contact of the light guide plate with the white reflective film, and convex portions formed on at least one surface of the base white film play a role of a spacer for suppressing unevenness in the luminance.

A method for measuring convexities and concaves on the surface of the light guide plate is as follows.
(i) When a sample is taken out from a liquid crystal television product, a light guide plate placed on the upper part of the white reflective film is taken out as a measurement sample.
(ii) The light guide plate is cut into pieces of 5 cm square.
(iii) Observations are made with the magnification of an objective lens set to 20× using Laser Microscope VK-9700 manufactured by KEYENCE CORPORATION, and areas detected to have a height or depth of 1 μm or more are considered as surface convexities and concaves.
(iv) The height or depth of convexities and concaves is calculated by a profile function of attached analytical software.
(v) The measurements described above are conducted for randomly collected 5 samples, and a number average thereof is designated as "surface convexities and concaves of light guide plate".

EXAMPLES

The present invention will be described further in detail below with Examples, but the present invention is not limited by these Examples. Measurement and evaluation methods are shown below.

(1) Stiffness
(i) Measurements were made in a test environment of 23° C. and 50% RH in accordance with JIS P8125 (2000) using "STIFFNESS TESTER" V5 manufactured by TARBER INSTRUMENT corp.
(ii) Measurements were made three times in each of both the directions of the reflective surface side and the non-reflective surface side of the white reflective film, and an average of the measurements was designated as "stiffness".

(2) Maximum Height of Convex Portions
(i) Random 5 areas (2 mm×2 mm) of a surface at the convex portion side of the white reflective film were observed using Scanning Electron Microscope ABT-32 manufactured by TOPCON CORPORATION. The largest convex portion among the 5 areas observed was selected.
(ii) The selected convex portion was then cut along a direction perpendicular to the film plane at a knife tilt angle of 3° using Rotary Microtome manufactured by Nippon Microtome Laboratory Co., Ltd. A film cross section obtained was observed using Scanning Electron Microscope ABT-32 manufactured by TOPCON CORPORATION.
(iii) Five concave portions having the smallest thickness were selected in an area of 2 mm×2 mm of a film cross section photograph obtained, differences between the concave portions and the selected convex portion were calculated, and a number average of the values was designated as "maximum height of convex portions".

(3) Cushion Rate at the Non-Reflective Surface Side
(i) A seat of 10 g was mounted on the upper part of a spindle of a dial gage manufactured by Mitutoyo Corporation and brought down onto a sample set on a measurement table by lifting the spindle in a test environment of 23° C. and 50% RH. At this time, the non-reflective surface was situated at the spindle side.
(ii) A weight of 50 g was placed on the seat, the thickness was read after 5 seconds, and this value was taken as a μm.
(iii) The weight on the seat was replaced by a weight of 500 g, the thickness was read after 5 seconds, this value was taken as b μm, and a value determined by the following formula was designated as "cushion rate c".

$$\text{Cushion rate } c \ (\%) = 100 \times (a-b)/a.$$

(4) Compressive Strength of Spherical Particles
(i) A binder resin was extracted from the coating layer of the white reflective film using an organic solvent, the organic solvent was distilled away, and spherical particles in the coating layer were then collected.
(ii) Micro Compression Testing Machine MCTM 2000 manufactured by Shimadzu Corporation was used to measure a deformation volume and a load of a resin particle when a load of 1 gf was applied at a constant loading rate to one of particles obtained, and a load when the particle diameter was deformed by 10% and a particle radius before compression were included in the formula:

$$\text{compressive strength } (\text{kgf/mm}^2) = 2.8 \times \text{load (kgf)}/\{\pi \times (\text{particle radius (mm)})^2\}.$$

(iii) The above steps (i) and (ii) were carried out for randomly collected 5 samples, and an average thereof was designated as "compressive strength of spherical particles".

(5) Specific Gravity of Spherical Particles
The method for measuring the specific gravity of spherical particles according to the present invention is as follows.
(i) A binder resin was extracted from the coating layer of the white reflective film using an organic solvent, the organic solvent was distilled away, and spherical particles in the coating layer were then collected.
(ii) A real density measuring device (for example AUTO TRUE DENSER MAT-7000 manufactured by SEISHIN ENTERPRISE Co., Ltd.) was used to make measurements for randomly collected 5 samples, and a number average thereof was designated as "specific gravity of spherical particles".

(6) Surface Convexities and Concaves of Light Guide Plate
(i) A light guide plate placed on the upper part of the white reflective film was taken out from a liquid crystal television.

(ii) The light guide plate was cut into pieces of 5 cm square.
(iii) Observations were made with the magnification of an objective lens set to 20× using Laser Microscope VK-9700 manufactured by KEYENCE CORPORATION, and areas detected to have a height or depth of 1 μm or more were considered as surface convexities and concaves.
(iv) The height or depth of convexities and concaves was calculated by a profile function of attached analytical software.
(v) The measurements described above were conducted for randomly collected 5 samples, and a number average thereof was designated as "surface convexities and concaves of light guide plate".

(7) Evaluation of Unevenness in the Luminance in Backlight

A 17-inch liquid crystal television (VIERA TH-L17F1 manufactured by Panasonic Corporation) was disassembled, and an edge-lit backlight having an LED as a light source (referred to as backlight A) was taken out. The light emitting surface of the backlight A had a size of 37.5 cm×21.2 cm and a diagonal length of 43.1 cm. Further, 3 optical films, a light guide plate (acryl plate, thickness: 3.5 mm, convex portion: 12 μm) and a reflective film were taken out from the backlight A, and the reflective films of Examples of the present invention and Comparative Examples were cut out into a shape and size same as the shape and size of the mounted reflective film. In place of the mounted reflective film, the reflective film that was cut out was placed such that the surface provided with convex portions faced the light guide plate side, and the light guide plate and 3 optical films were placed in the same order and direction as before disassembly.

A 40-inch liquid crystal television (PAVV UN40 B7000 WF manufactured by Samsung Electronics Co., Ltd.) was also disassembled, and an edge-lit backlight having an LED as a light source (referred to as backlight B) was taken out. The light emitting surface of the backlight B had a size of 89.0 cm×50.2 cm and a diagonal length of 102.2 cm. Further, 3 optical films, a light guide plate (acryl plate, thickness: 4 mm, convex portion: 15 μm) and a reflective film were taken out from the backlight B, and the reflective films of Examples of the present invention and Comparative Examples were cut out into a shape and size same as the shape and size of the mounted reflective film. In place of the mounted reflective film, the reflective film that was cut out was placed such that the surface provided with convex portions faced the light guide plate side, and the light guide plate and 3 optical films were placed in the same order and direction as before disassembly.

For these backlights, presence/absence of unevenness in the luminance was visually evaluated in the manner described below. A reflective film was evaluated as "acceptable" if it belonged to class A or B for both the 17-inch and 40-inch televisions, and a reflective film was evaluated as "not-acceptable" if it belonged to class C for any of the 17-inch and 40-inch televisions.
Class A: unevenness in the luminance cannot be visually perceived from any angle.
Class B: unevenness in the luminance cannot be visually perceived when viewed from the front direction, but unevenness in the luminance can be visually perceived when viewed from a slanted direction of 45°.
Class C: unevenness in the luminance can be visually perceived locally when viewed from the front direction.
Class D: unevenness in the luminance can be visually perceived over the whole screen when viewed from the front direction.

(8) Evaluation of Scrapes on Light Guide Plate

A white reflective film was laminated on a light guide plate obtained by disassembling the 40-inch liquid crystal television (PAVV UN40 B7000 WF manufactured by Samsung Electronics Co., Ltd.) such that convex portions of the white reflective film contacted the light guide plate, the reflective sheet sample was then lifted at line speed of 1 m/min under loads of 200 gf/cm$^2$ (0.0196 MPa), 100 gf/cm$^2$ (0.0098 MPa) and 50 gf/cm$^2$ (0.0049 MPa), and the degree of scratches generated on the surface of the light guide plate was checked with the naked eye to make evaluations in the manner described below. The above procedure was conducted three times under each load for the same sample, and visual evaluations were made.
Class A: no scratches are found under any of the loads.
Class B: scratches are found under the load of 200 gf/cm$^2$, but no scratches are found under the loads of 100 gf/cm$^2$ and 50 gf/cm$^2$.
Class C: scratches are found under the loads of 200 gf/cm$^2$ and 100 gf/cm$^2$, but no scratches are found under the load of 50 gf/cm$^2$.
Class D: scratches are found under the load of 50 gf/cm$^2$.

(9) Evaluation of White Spots

A 52-inch liquid crystal television (BRAVIA KDL-52 EX 700 manufactured by Sony Corporation) was disassembled, and an edge-lit backlight having an LED as a light source (referred to as backlight C) was taken out. The light emitting surface of the backlight C had a size of 116 cm×65.5 cm and a diagonal length of 133.2 cm. Further, 3 optical films, a concave light guide plate (acryl plate, thickness: 4 mm, concave portion: 55 μm) and a reflective film were taken out from the backlight C, and the reflective films of Examples of the present invention and Comparative Examples were cut out into a shape and size same as the shape and size of the mounted reflective film. In place of the mounted reflective film, the reflective film that was cut out was placed such that the surface provided with convex portions faced the light guide plate side, and the light guide plate and 3 optical films were placed in the same order and direction as before disassembly.
Class A: no white spots are found.
Class B: white spots are found.

(10) Evaluation of Dispersibility of Spherical Particles

Time taken until a coating was separated into two layers was measured in a test environment of 23° C. and 50% RH in conformance with JIS K5600-2-6 (1999). In the present invention, evaluations were made in the manner described below. The longer the time, the better.
Class A: 45 minutes or more
Class B: equal to or more than 30 minutes and less than 45 minutes
Class C: equal to or more than 15 minutes and less than 30 minutes
Class D: less than 15 minutes (11) Curl Evaluation The white reflective film was cut out into a strip having a width of 10 mm and a length of 150 mm, wound around a cardboard tube having a 1-type diameter (2.54 cm), stored at normal temperature and a relative humidity of 55% for 24 hours, and then released. Thereafter, the film was left standing for 24 hours with a flat plate placed so as to be concave upward, an observed rise (distance between the film edge and the flat plate) was then measured, and evaluations were made according to the criteria described below. For winding the film around the cardboard tube, 3 samples were wound with the reflective layer on the inner surface side and 3 samples were wound with the reflective layer on the outer surface side to make measurements for total 6 samples, and an average for 3 samples greater in rise was taken.

Class A: less than 20 mm
Class B: from 20 to 30 mm
Class C: from more than 30 mm to 40 mm
Class D: more than 40 mm

Example 1

A coating liquid formed by adding 5.25 g of "HALSHYBRID" (registered trademark) UV-G720 T (acrylic copolymer; solution with a concentration of 40%; refractive index: 1.58; manufactured by Nippon Shokubai Co., Ltd.), 3.85 g of ethyl acetate and 0.9 g of acryl resin particles ("TECHPOLYMER" (registered trademark) BM30X-8 manufactured by Sekisui Plastics Co., Ltd.; refractive index: 1.49; volume average particle diameter: 8.0 µm; coefficient of variation: 35%) with stirring was prepared. One surface of a white film comprising porous biaxially stretched polyethylene terephthalate having a thickness of 300 µm (base white film; "Lumirror" (registered trademark) E6SQ manufactured by Toray Industries, Inc.), which contained polymethylpentene, was coated with the coating liquid using a metaling bar #16 and dried at 120° C. for a minute to provide a coating layer.

Example 2

A coating liquid formed by adding 5.25 g of "HALSHYBRID" (registered trademark) UV-G720 T (acrylic copolymer; solution with a concentration of 40%; refractive index: 1.58; manufactured by Nippon Shokubai Co., Ltd.), 3.85 g of ethyl acetate and 0.9 g of acryl resin particles ("TECHPOLYMER" (registered trademark) BM30X-15 manufactured by Sekisui Plastics Co., Ltd.; refractive index: 1.49; volume average particle diameter: 15 µm; coefficient of variation: 35%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Example 3

A coating liquid formed by adding 4.50 g of "HALSHYBRID" (registered trademark) UV-G720 T (acrylic copolymer; solution with a concentration of 40%; refractive index: 1.58; manufactured by Nippon Shokubai Co., Ltd.), 4.30 g of ethyl acetate and 1.20 g of acryl resin particles ("TECHPOLYMER" (registered trademark) BM30X-8 manufactured by Sekisui Plastics Co., Ltd.; refractive index: 1.49; volume average particle diameter: 30 µm; coefficient of variation: 35%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Example 4

A coating layer was provided to obtain a white reflective film in the same manner as in Example 3 except that the type of spherical particles in a coating liquid for forming a coating layer was changed to acryl resin particles ("TECHPOLYMER" (registered trademark) MBX-30 manufactured by Sekisui Plastics Co., Ltd.; refractive index: 1.49; volume average particle diameter: 40 µm; coefficient of variation: 35%).

Example 5

A coating liquid formed by adding 3.0 g of "HALSHYBRID" (registered trademark) UV-G720 T (acrylic copolymer; solution with a concentration of 40%; refractive index: 1.58; manufactured by Nippon Shokubai Co., Ltd.), 5.2 g of ethyl acetate and 1.8 g of acryl resin particles ("TECHPOLYMER" (registered trademark) MBX-40 manufactured by Sekisui Plastics Co., Ltd.; refractive index: 1.49; volume average particle diameter: 40 µm; coefficient of variation: 35%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Example 6

A coating liquid formed by adding 6.0 g of "HALSHYBRID" (registered trademark) UV-G720 T (acrylic copolymer; solution with a concentration of 40%; refractive index: 1.58; manufactured by Nippon Shokubai Co., Ltd.), 3.4 g of ethyl acetate and 0.6 g of nylon 6 resin particles (TR-1 manufactured by Toray Industries, Inc.; refractive index: 1.53; volume average particle diameter: 13 µm; coefficient of variation: 48%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Example 7

A coating liquid formed by adding 5.25 g of "HALSHYBRID" (registered trademark) UV-G720 T (acrylic copolymer; solution with a concentration of 40%; refractive index: 1.58; manufactured by Nippon Shokubai Co., Ltd.), 3.85 g of ethyl acetate and 0.9 g of nylon 12 resin particles (SP 10 manufactured by Toray Industries, Inc.; refractive index: 1.53; volume average particle diameter: 10 µm; coefficient of variation: 48%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Example 8

A coating liquid formed by adding 5.25 g of "HALSHYBRID" (registered trademark) UV-G720 T (acrylic copolymer; solution with a concentration of 40%; refractive index: 1.58; manufactured by Nippon Shokubai Co., Ltd.), 3.85 g of ethyl acetate and 0.9 g of resin particles comprising a copolymer of nylon 6 and nylon 12 (SP 20 manufactured by Toray Industries, Inc.; refractive index: 1.52; volume average particle diameter: 40 µm; coefficient of variation: 29%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Example 9

A coating liquid formed by adding 3.0 g of "HALSHYBRID" (registered trademark) UV-G720 T (acrylic copolymer; solution with a concentration of 40%; refractive index: 1.58; manufactured by Nippon Shokubai Co., Ltd.), 5.2 g of ethyl acetate, 0.18 g of resin particles comprising a copolymer of nylon 6 and nylon 12 (SP 20 manufactured by Toray Industries, Inc.; refractive index: 1.52; volume average particle diameter: 40 µm; coefficient of variation: 29%) and 1.62 g of acryl resin particles ("TECHPOLYMER" (registered trademark) BMX 5 manufactured by Sekisui Plastics Co., Ltd.; refractive index: 1.49; volume average particle diameter: 5 µm; coefficient of variation: 35%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Example 10

A coating liquid formed by adding 5.25 g of "HALSHYBRID" (registered trademark) UV-G720 T (acrylic copolymer; solution with a concentration of 40%; refractive index: 1.58; manufactured by Nippon Shokubai Co., Ltd.), 3.85 g of ethyl acetate and 0.9 g of nylon 12 resin particles (SP 10 manufactured by Toray Industries, Inc.; refractive index: 1.53; volume average particle diameter: 10 µm; coefficient of variation: 48%) with stirring was prepared. One surface of a white film comprising porous biaxially stretched polyethylene terephthalate having a thickness of 250 µm ("Lumirror" (registered trademark) E6SQ manufactured by Toray Industries, Inc.) was coated with the coating liquid using a metaling bar #16 and dried at 120° C. for a minute to provide a coating layer.

Example 11

A coating layer was provided to obtain a white reflective film in the same manner as in Example 10 except that the base white film was changed to a white film comprising porous biaxially stretched polyethylene terephthalate having a thickness of 300 µm ("Lumirror" (registered trademark) E80B manufactured by Toray Industries, Inc.), which contained a cyclic polyolefin.

Example 12

A coating layer was provided to obtain a white reflective film in the same manner as in Example 10 except that the base white film was changed to a white film comprising porous biaxially stretched polyethylene terephthalate having a thickness of 225 µm ("Tetoron" (registered trademark) Film UXSP manufactured by Teijin DuPont Films Japan Limited), which contained barium sulfate.

Example 13

A coating layer was provided to obtain a white reflective film in the same manner as in Example 10 except that the base white film was changed to a white film comprising porous biaxially stretched polyethylene terephthalate having a thickness of 400 µm ("Lumirror" (registered trademark) E6SQ manufactured by Toray Industries, Inc.), which contained polymethylpentene.

Example 14

(i) A coating liquid formed by adding 5.25 g of "HALSHYBRID" (registered trademark) UV-G720 T (acrylic copolymer; solution with a concentration of 40%; refractive index: 1.58; manufactured by Nippon Shokubai Co., Ltd.), 3.85 g of ethyl acetate and 0.9 g of nylon 12 resin particles (SP 10 manufactured by Toray Industries, Inc.; refractive index: 1.53; volume average particle diameter: 10 µm; coefficient of variation: 48%) with stirring was prepared. One surface of a white film comprising porous biaxially stretched polyethylene terephthalate having a thickness of 188 µm ("Tetoron" (registered trademark) Film UX manufactured by Teijin DuPont Films Japan Limited), which contained barium sulfate, was coated with the coating liquid using a metaling bar #16 and dried at 120° C. for a minute to provide a coating layer to obtain a white reflective film having a convex surface.

(ii) 16 parts of dry-laminating agent "Dick Dry" (registered trademark) LX-903 manufactured by Dainippon Ink and Chemicals, Incorporated, 2 parts of KL-75 manufactured by Dainippon Ink and Chemicals, Incorporated as a curing agent and 29.5 parts of ethyl acetate weighed, and stirred for 15 minutes to thereby obtain a dry-laminating adhesive having a solid concentration of 20%. One surface of a white film comprising porous biaxially stretched polyethylene terephthalate having a thickness of 188 µm ("Lumirror" (registered trademark) E6SQ manufactured by Toray Industries, Inc.), which contained polymethylpentene, was coated with the adhesive using a metaling bar #16 and dried at 120° C. for a minute to provide a dry-laminating adhesive layer.

(iii) A surface opposite to the convex surface of the white reflective film obtained in the procedure (i) and a coating surface of the dry-laminating adhesive obtained in the procedure (ii) were dry-laminated to obtain a white reflective film.

Comparative Example 1

A white film comprising porous biaxially stretched polyethylene terephthalate having a thickness of 300 µm ("Lumirror" (registered trademark) E6SQ manufactured by Toray Industries, Inc.) was prepared as a base white film. This white film was provided with no convex portions and evaluated directly as a reflective film.

Comparative Example 2

A coating liquid formed by adding 3.0 g of "HALSHYBRID" (registered trademark) UV-G720 T (acrylic copolymer; solution with a concentration of 40%; refractive index: 1.58; manufactured by Nippon Shokubai Co., Ltd.), 5.2 g of ethyl acetate and 1.8 g of acryl resin particles ("TECHPOLYMER" (registered trademark) MBX50 manufactured by Sekisui Plastics Co., Ltd.; refractive index: 1.49; volume average particle diameter: 50 µm; coefficient of variation: 35%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Comparative Example 3

A coating liquid formed by adding 6.0 g of "HALSHYBRID" (registered trademark) UV-G720 T (acrylic copolymer; solution with a concentration of 40%; refractive index: 1.58; manufactured by Nippon Shokubai Co., Ltd.), 3.4 g of ethyl acetate and 0.6 g of acryl resin particles ("TECHPOLYMER" (registered trademark) BM30X-5 manufactured by Sekisui Plastics Co., Ltd.; refractive index: 1.49; volume average particle diameter: 5 µm; coefficient of variation: 35%) with stirring was prepared. One surface of a white film comprising porous biaxially stretched polyethylene terephthalate having a thickness of 300 µm ("Lumirror" (registered trademark) E6SQ manufactured by Toray Industries, Inc.) was coated with the coating liquid using a metaling bar #16 and dried at 120° C. for a minute to provide a coating layer.

Comparative Example 4

A coating liquid formed by adding 5.25 g of "HALSHYBRID" (registered trademark) UV-G720 T (acrylic copolymer; solution with a concentration of 40%; refractive index: 1.58; manufactured by Nippon Shokubai Co., Ltd.), 3.85 g of ethyl acetate and 0.9 g of nylon 12 resin particles (SP 10 manufactured by Toray Industries, Inc.; refractive index: 1.53; volume average particle diameter: 10 µm; coefficient of variation: 48%) with stirring was prepared. One surface of a white film comprising porous biaxially stretched polyethylene terephthalate having a thickness of 188 µm ("Tetoron" (registered trademark) Film UX manufactured by Teijin DuPont Films Japan Limited) was coated with the coating liquid using a metaling bar #16 and dried at 120° C. for a minute to provide a coating layer.

Comparative Example 5

A coating liquid formed by adding 5.25 g of "HALSHYBRID" (registered trademark) UV-G720 T (acrylic copolymer; solution with a concentration of 40%; refractive index: 1.58; manufactured by Nippon Shokubai Co., Ltd.), 3.85 g of ethyl acetate and 0.9 g of nylon 12 resin particles (SP 10 manufactured by Toray Industries, Inc.; refractive index: 1.53; volume average particle diameter: 10 µm; coefficient of variation: 48%) with stirring was prepared. One surface of a white film comprising porous biaxially stretched polyethylene terephthalate having a thickness of 188 µm ("Lumirror" (registered trademark) E6SQ manufactured by Toray Industries, Inc.) was coated with the coating liquid using a metaling bar #16 and dried at 120° C. for a minute to provide a coating layer.

Comparative Example 6

16 parts of dry-laminating agent "Dick Dry" (registered trademark) LX-903 manufactured by Dainippon Ink and Chemicals, Incorporated, 2 parts of KL-75 manufactured by Dainippon Ink and Chemicals, Incorporated as a curing agent and 29.5 parts of ethyl acetate weighed, and stirred for 15 minutes to thereby obtain a dry-laminating adhesive having a solid concentration of 20%. One surface of a white film comprising porous biaxially stretched polyethylene terephthalate having a thickness of 188 µm ("Lumirror" (registered trademark) E6SQ manufactured by Toray Industries, Inc.) was coated with the adhesive using a metaling bar #16 and dried at 120° C. for a minute to provide a dry-laminating adhesive layer, and the dry-laminating adhesive layer was dry-laminated with a surface opposite to the convex surface of the white reflective film obtained in Example 7 to obtain a white reflective film.

Comparative Example 7

16 parts of dry-laminating agent "Dick Dry" (registered trademark) LX-903 manufactured by Dainippon Ink and Chemicals, Incorporated, 2 parts of KL-75 manufactured by Dainippon Ink and Chemicals, Incorporated as a curing agent and 29.5 parts of ethyl acetate weighed, and stirred for 15 minutes to thereby obtain a dry-laminating adhesive having a solid concentration of 20%. One surface of a white film comprising porous biaxially stretched polyethylene terephthalate having a thickness of 188 µm ("Tetoron" (registered trademark) Film UXSP manufactured by Teijin DuPont Films Japan Limited) was coated with the adhesive using a metaling bar #16 and dried at 120° C. for a minute to provide a dry-laminating adhesive layer, and the dry-laminating adhesive layer was dry-laminated with a surface opposite to the convex surface of the white reflective film obtained in Comparative Example 5 to obtain a white reflective film.

Comparative Example 8

A coating liquid formed by adding 6.0 g of "HALSHYBRID" (registered trademark) UV-G720 T (acrylic copolymer; solution with a concentration of 40%; refractive index: 1.58; manufactured by Nippon Shokubai Co., Ltd.), 3.4 g of ethyl acetate and 0.9 g of nylon 12 resin particles (SP 50 manufactured by Toray Industries, Inc.; refractive index: 1.53; volume average particle diameter: 5 µm; coefficient of variation: 48%) with stirring was prepared. One surface of a white film comprising porous biaxially stretched polyethylene terephthalate having a thickness of 188 µm ("Tetoron" (registered trademark) Film UX manufactured by Teijin DuPont Films Japan Limited) was coated with the coating liquid using a metaling bar #16 and dried at 120° C. for a minute to provide a coating layer.

TABLE 1

| | Thickness of base white film [µm] | Type of base white film | Particle composition | Type of spherical particles | Added amount of spherical particles [% by mass] | Stiffness [mN · m] | Maximum height of convex portions [µm] | Cushion rate at the non-reflective surface side [%] | Compressive strength of spherical particles [kgf/mm$^2$] | Specific gravity of particles [kgf/mm$^2$] |
|---|---|---|---|---|---|---|---|---|---|---|
| Example 1 | 300 | E6SQ | Acryl | BM30X-8 | 30 | 3.1 | 17 | 25 | 1.8 | 1.10 |
| Example 2 | | E6SQ | Acryl | BM30X-15 | 30 | | 32 | | | |
| Example 3 | | E6SQ | Acryl | BM30X-30 | 40 | | 41 | | | |
| Example 4 | | E6SQ | Acryl | MBX30 | 40 | | | | 2.4 | 1.20 |
| Example 5 | | E6SQ | Acryl | MBX40 | 60 | | 55 | | | |

TABLE 1-continued

| | Thickness of base white film [μm] | Type of base white film | Particle composition | Type of spherical particles | Added amount of spherical particles [% by mass] | Stiffness [mN · m] | Maximum height of convex portions [μm] | Cushion rate at the non-reflective surface side [%] | Compressive strength of spherical particles [kgf/mm²] | Specific gravity of particles [kgf/mm²] |
|---|---|---|---|---|---|---|---|---|---|---|
| Example 6 | | E6SQ | Nylon 6 | TR-1 | 20 | | 22 | | 1.3 | 1.14 |
| Example 7 | | E6SQ | Nylon 12 | SP10 | 30 | | | | 1.1 | 1.02 |
| Example 8 | | E6SQ | Copolymer of nylon 12 and nylon 6 | SP20 | 30 | | 55 | | 1.1 | 1.02 |
| Example 9 | | E6SQ | Acryl | MBX5 | 54 | | 55 | | 2.4 | 1.20 |
| | | | Copolymer of nylon 12 and nylon 6 | SP20 | 6 | | | | 1.1 | 1.02 |
| Example 10 | 250 | E6SQ | Nylon 12 | SP10 | 30 | 2.2 | 22 | 25 | 1.1 | 1.02 |
| Example 11 | 300 | E80B | | | | 2.4 | | 29 | | |
| Example 12 | 225 | UXSP | | | | 2.4 | | 14 | | |
| Example 13 | 400 | E6SQ | | | | 7 | | 22 | | |
| Example 14 | Dry laminate of 188 μm and 188 μm | Dry laminate of UX and E6SQ | Nylon 12 | SP10 | 30 | 9 | 22 | 25 | 11 | 1.02 |
| Comparative Example 1 | 300 | E6SQ | No convex portions formed | | — | 3.1 | — | 25 | — | — |
| Comparative Example 2 | | | Acryl | MBX50 | 60 | | 70 | | 3 | 1.20 |
| Comparative Example 3 | | | Acryl | BM30X-5 | 20 | | 11 | | 1.8 | 1.10 |
| Comparative Example 4 | 188 | UX | Nylon 12 | SP10 | 30 | 1.6 | 22 | 10 | 1.2 | 1.02 |
| Comparative Example 5 | 188 | E6SQ | | | | 1.0 | | 25 | | |
| Comparative Example 6 | Dry laminate of 300 μm and 188 μm | Dry laminate of E6SQ and E6SQ | | | | 11 | | | | |
| Comparative Example 7 | Dry laminate of 188 μm and 188 μm | Dry laminate of E6SQ and UX | | | | 9 | | 10 | | |
| Comparative Example 8 | 188 | UX | | SP500 | 20 | 1.6 | 13 | 10 | | 1.14 |

TABLE 2

| | Evaluation of unevenness in the luminance in backlight A (17 inches) | Evaluation of unevenness in the luminance in backlight B (40 inches) | Scrape of light guide plate | White spot | Dispersbility of spherical particles | Curl |
|---|---|---|---|---|---|---|
| Example 1 | A | A | C | B | C | B |
| Example 2 | | | | | | |
| Example 3 | | | | | | |
| Example 4 | | | D | A | D | |
| Example 5 | | | | | | |
| Example 6 | | | B | B | B | |
| Example 7 | | | A | | A | |
| Example 8 | | | | | | |
| Example 9 | | | | A | D | |
| Example 10 | | B | B | A | | A |
| Example 11 | | | | | | |
| Example 12 | | | | | | |
| Example 13 | | A | | | | C |
| Example 14 | | | | | | D |
| Comparative Example 1 | B | D | A | B | — | A |
| Comparative Example 2 | | C | D | A | D | A |
| Comparative Example 3 | | | C | B | C | A |
| Comparative Example 4 | | | A | A | A | A |
| Comparative Example 5 | | | | | A | |
| Comparative Example 6 | | | | | | D |

TABLE 2-continued

| | Evaluation of unevenness in the luminance in backlight A (17 inches) | Evaluation of unevenness in the luminance in backlight B (40 inches) | Scrape of light guide plate | White spot | Dispersbility of spherical particles | Curl |
|---|---|---|---|---|---|---|
| Comparative Example 7 | | | | | | D |
| Comparative Example 8 | | | B | | | A |

The white reflective films of the present invention of Examples 1 to 14 were "acceptable" in evaluation of unevenness in the luminance. However, Examples 10, 11 and 12 with the stiffness of the white film being less than 3 are slightly inferior to Examples 1 to 9 in unevenness in the luminance in the 40-inch edge-lit backlight. Example 13 is excellent in unevenness in the luminance in the edge-lit backlight, but inferior in curl characteristics to Examples 1 to 7.

Examples 6 to 14 using nylon resin particles as spherical particles are more excellent in scrapes of the light guide plate than Examples 1 to 5 using acryl resin particles. Particularly, Examples 7 to 14 using resin particles comprising nylon 12 or a copolymer of nylon 6 and nylon 12 are excellent especially in scrapes of the light guide plate. On the other hand, among acryl resin particles, scrapes of the light guide plate diminish as the maximum convex portion of the white reflective film becomes smaller (Examples 1 to 3), and scrapes of the light guide plate diminish as the compressive strength of spherical particles decreases when the height of the convex portion is the same (Examples 3 and 4).

In terms of white spots in the backlight using a light guide plate having concave portions, when acryl particles having a relatively small particle diameter are mixed with resin particles comprising a copolymer of nylon 6 and nylon 12 and having a relatively large particle diameter, the resin particles comprising a copolymer of the nylons dominantly contact the light guide plate, and thus scrapes of the light guide plate become hard to occur and white spots can be prevented by acryl particles hidden behind the nylon. That is, scrapes of the light guide plate can be prevented while preventing white spots. (Example 9)

In terms of dispersibility of spherical particles, Examples 6 to 8 and 10 to 13 with the particle composition being constituted by nylon resin particles alone are more excellent than Examples 1 to 5 and 9 using acryl resin particles, and resin particles comprising nylon 12 and a copolymer of nylon 6 and nylon 12 and having a specific gravity close to that of ethyl acetate as a solvent are most excellent.

On the other hand, when the stiffness and the cushion rate at the non-reflective surface side were made constant and no convex portions were provided, the result was very poor particularly in unevenness in the luminance in the 40-inch edge-lit backlight (Comparative Example 1). When the maximum height of convex portions was too large and too small, the results were also poor particularly in unevenness in the luminance in the 40-inch edge-lit backlight (Comparative Examples 2 and 3).

Further, when the maximum height of convex portions and the cushion rate at the non-reflective surface side were made constant and the stiffness was excessively increased and excessively reduced, the unevenness in the luminance in the edge-lit backlight became worse (Comparative Examples 5 and 6). Further, when the maximum height of convex portions was fixed while excessively reducing the cushion rate at the non-reflective surface side, the unevenness in the luminance in the edge-lit backlight became worse (Comparative Examples 4 and 7).

Lamination of the white film with an adhesive led to the poorest result in terms of curl (Comparative Examples 6 and 7).

As a result of examining the maximum height of convex portions with the particle composition being fixed to nylon 12 in scrapes of the light guide plate, Comparative Example 7 was better than Comparative Example 8, and surprisingly smaller convex portions led to poorer results.

REFERENCE SIGNS LIST

1 white reflective film
2 light guide plate
3 light emitting diode
4 hick chassis
5 convex portion (light guide plate)
6 concave portion (light guide plate)
7 concave portion (back chassis)
8 convex portion
9 coating layer
10 particle
11 base white film

The invention claimed is:

1. A white reflective film for an edge-lit backlight, wherein the film satisfies (i) to (iii):
   (i) a stiffness of 3 to 10 mN·m;
   (ii) convex portions are formed on at least a first surface of the film and a maximum height of the convex portions is 15 to 60 μm; and
   (iii) a cushion rate at a side of a second surface opposite the first surface of the film is 12% or more.

2. The white reflective film as set forth in claim 1, wherein the white reflective film comprises a base white film which has on at least one surface a coating layer containing spherical particles, and a compressive strength of the spherical particles is 0.1 to 2.0 kgf/mm$^2$.

3. The white reflective film as set forth in claim 2, wherein the spherical particles comprise nylon.

4. The white reflective film as set forth in claim 3, wherein the nylon is nylon 12, a copolymer of nylon 6 and nylon 12 or nylon 12 and a copolymer of nylon 6 and nylon 12.

5. The white reflective film as set forth in claim 2, wherein specific gravity of the spherical particles is 0.8 to 1.10.

6. A backlight for a liquid crystal display comprising the white reflective film as set forth in claim 1, the film having a backlight size of 76.2 cm (30 inches) or greater.

7. The backlight as set forth in claim 6, wherein the backlight comprises a light guide plate which has a concave portion on a surface and a convex portion on a surface and a height difference between a lowest point of the concave portion to the highest part of the convex portion is 10 μm or greater, and the white reflective film is placed such that the convex portions of the first surface of the film face the light guide plate.

8. The white reflective film as set forth in claim 3, wherein a specific gravity of the spherical particles is 0.8 to 1.10.

9. The white reflective film as set forth in claim 4, wherein a specific gravity of the spherical particles is 0.8 to 1.10.

10. A backlight for a liquid crystal display comprising the white reflective film as set forth in claim 2, the film having a backlight size of 76.2 cm (30 inches) or greater.

11. A backlight for a liquid crystal display comprising the white reflective film as set forth in claim 3, the film having a backlight size of 76.2 cm (30 inches) or greater.

12. A backlight for a liquid crystal display comprising the white reflective film as set forth in claim 4, the film having a backlight size of 76.2 cm (30 inches) or greater.

13. A backlight for a liquid crystal display comprising the white reflective film as set forth in claim 5, the film having a backlight size of 76.2 cm (30 inches) or greater.

14. A backlight for a liquid crystal display comprising the white reflective film as set forth in claim 8, the film having a backlight size of 76.2 cm (30 inches) or greater.

15. A backlight for a liquid crystal display comprising the white reflective film as set forth in claim 9, the film having a backlight size of 76.2 cm (30 inches) or greater.

\* \* \* \* \*